United States Patent [19]

Männel

[11] Patent Number: 4,526,116

[45] Date of Patent: Jul. 2, 1985

[54] METHOD AND ARRANGEMENT TO CONTROL AN AUTOMATIC EMBROIDERY MACHINE

[75] Inventor: Friedrich Männel, Kraichtal, Fed. Rep. of Germany

[73] Assignee: GVT Gesellschaft fur Verfahrenstechnik der garnverarbeitenden Industrie mbH, Ludwigshafen, Fed. Rep. of Germany

[21] Appl. No.: 420,292

[22] Filed: Sep. 20, 1982

[30] Foreign Application Priority Data

Sep. 26, 1981 [DE] Fed. Rep. of Germany ....... 3138364

[51] Int. Cl.³ .............................................. D05C 5/06
[52] U.S. Cl. .................................. 112/266.1; 112/103; 112/79 A; 112/121.12
[58] Field of Search ...................... 112/121.11, 121.12, 112/121.15, 2, 102, 103, 79 A, 79 R; 139/319; 364/400, 470; 318/568

[56] References Cited

U.S. PATENT DOCUMENTS

| 3,568,614 | 3/1971 | Shorrock . | |
|---|---|---|---|
| 3,722,434 | 3/1973 | Strother et al. | 112/79 A |
| 3,752,095 | 8/1973 | Brown . | |
| 4,019,036 | 4/1977 | Hiramatsu et al. . | |
| 4,106,416 | 8/1978 | Blackstone, Jr. et al. | 112/79 A |
| 4,429,364 | 1/1984 | Maruyama et al. | 112/121.11 X |

FOREIGN PATENT DOCUMENTS

| 0075801 | 9/1980 | European Pat. Off. | 112/121.11 |
|---|---|---|---|
| 1485466 | 10/1969 | Fed. Rep. of Germany | 112/79 A |
| 2938294 | 4/1980 | Fed. Rep. of Germany | 112/121.12 |
| 1536287 | 7/1968 | France . | |
| 1587606 | 3/1970 | France . | |
| 1059290 | 2/1967 | United Kingdom . | |
| 1238846 | 7/1971 | United Kingdom . | |
| 1338998 | 11/1973 | United Kingdom | 112/79 A |
| 2009451 | 6/1979 | United Kingdom . | |
| 2097153 | 10/1982 | United Kingdom | 112/121.11 |

OTHER PUBLICATIONS

Graeme et al., Operational Amplifiers, 1971, McGraw-Hill Book Company, pp. 358-369.

*Primary Examiner*—Peter Nerbun
*Attorney, Agent, or Firm*—Wenderoth, Lind & Ponack

[57] ABSTRACT

For a method to control an automatic embroidery machine, the individual picture elements are copied from a motif carrier at hand and are transferred as an embroidery program to a storage element. To control the automatic embroidery machine automatically, according to the motif, it is provided that the motif, which has been converted to half-tones, is recorded line-by-line as a scannable picture, wherein, if need be, a color-specific picture with scannable half-tones is recorded for each color with color motifs; each picture is line-scanned, and each picture element, which represents a half-tone of optional intensity, is compared to an adjustable half-tone barrier or a fixed half-tone window, and is thus classified as being either lighter or darker and/or inside or outside of the half-tone window and is thus converted to a binary value; these binary values are stored and fed into a digital computer, which stores conversion programs for embroidery techniques, the motif, which has been converted to binary values, is composed section-by-section from the stored picture forms and the embroidery program, set up by the digital computer, is output to the automatic embroidery machine.

12 Claims, 1 Drawing Figure

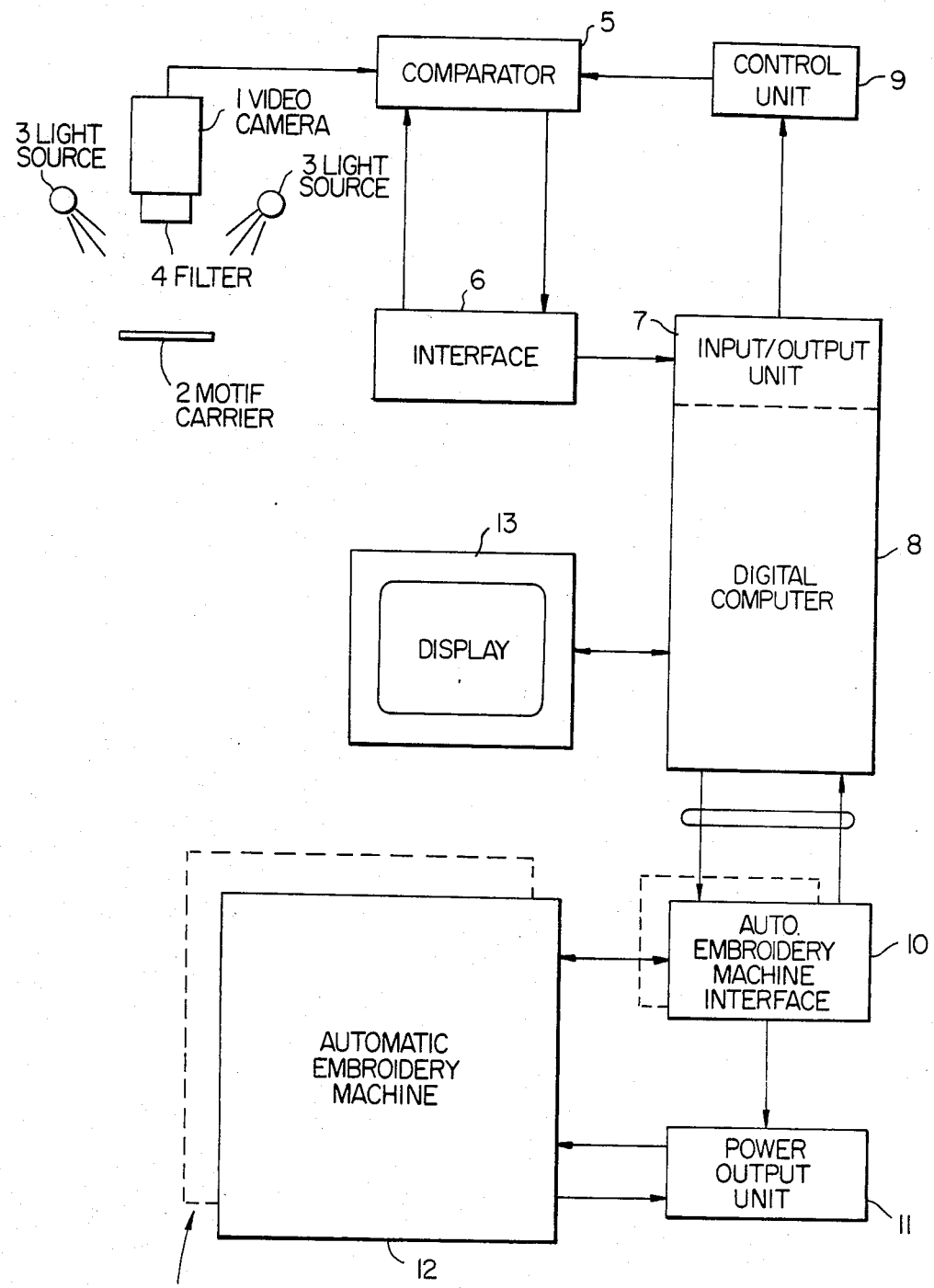

METHOD AND ARRANGEMENT TO CONTROL AN AUTOMATIC EMBROIDERY MACHINE

BACKGROUND OF THE INVENTION

A method and arrangement used to control an automatic embroidery machine, used in particular for the production of labels and badges, for which the individual picture elements are copied from a displayed motive carrier and are transferred as an embroidery program to a storage element, which controls at least one automatic embroidery machine with coordinate displacement of the embroidery frame.

Embroidered or woven labels and badges are known in many design versions, both black and white or in color. Lables, for example, contain product descriptions and/or size information, which should not be visible immediately on the finished product. Badges and emblems are worn on the outside and are used, for example, to show affiliation with a certain company.

To produce such labels and badges, small as well as large automatic embroidery machines are used for which the frame is operated with the aid of punched card tapes, so-called "jacquard cards." For the production of "jacquard cards," a drawing, the so-called "punch drawing," has to be made first from the embroidery motive, e.g. at a ratio of 1:6. With the aid of "punch machines," the movement information for the automatic embroidery machine is then transferred to the "jacquard card tape" by moving along the individual picture elements. The transfer of such storage elements in the form of punched cards requires a lot of time.

Newer "punch machine" designs, which in part are computer operated, can also compute simple lines and edges by moving a pilot pin along them and can transfer them to a punch card tape or a magnetic multi-channel storage tape.

While the maximum speed for the production of embroidery programs through manual punching, by trained "punchcard operators," is approximately 40 stitches per minute, this speed can be increased to 150 to 180 stitches per minute with the use of the above mentioned, semiautomatic "punch machines."

Furthermore, we are already familiar with electronic step-motor control of embroidery frames for small automatic embroidery machines, whereby the control impulses are accepted by an eight-channel magnetic tape, which corresponds to the "jacquard card tape."

In the case of individual motifs, already known automatic embroidery machines require a lot of time for the production of embroidery programs. In particular, no direct control of an automatic embroidery machine has so far been possible on the basis of the displayed pattern.

The invention proceeds from the problem of developing a method to control an automatic embroidery machine, perferably for the production of labels and badges, which results in essentially automatic production of the embroidery program, without manual operation of a scanning element. In addition, it should be possible to have direct control of one and/or a number of parallel operating automatic embroidery machines. The preparation of embroidery programs is to proceed from the motif at hand, if need be, and without use of an intermediate drawing ("punch drawing").

SUMMARY OF THE INVENTION

To solve this problem, it is planned that the motif is recorded as a line-scanned picture, converted into half-tones, and, if necessary, a color-specific picture with scannable half-tones is recorded for each color with color motifs; each picture is line-scanned, and each picture element, which represents a half-tone of optional intensity (between black and white), can be compared to an adjustable half-tone barrier and is then classified as either lighter or darker and thereby converted to a binary value; these binary values are stored and fed into a digital computer, which stores conversion programs for embroidery techniques, which are allocated to various, known geometric picture forms such as lines and areas, and are repeated in each embroidery pattern; the motif, which has been converted to binary values is composed section-by-section from the stored picture forms and the embroidery program thus created by the digital computer is issued directly or indirectly (by way of subsequent program register on call) to the automatic embroidery machine.

For an alternate version of the invention, it may be practical to use a so-called "half-tone window" instead of the half-tone barrier, which consists of two half tones of varied intensity and is used to determine whether the picture element is inside or outside of this window. With mutli-colored motif patterns, the method of digitalization with the aid of a half-tone window makes it possible to balance out intensity differences, simulated by varied lighting. It makes sense to make the width of this half-tone window adjustable so that it can be adjusted to the conditions of the motif pattern and the lighting.

In connection with the application at hand, the term "scannable picture" is to represent an image of the motif, which makes it possible to convert the brightness values into electric, magnetic or optical output quantities. The line scanning can be done either horizontally or vertically. Furthermore, the use of a line camera is possible, which scans all elements of a line simultaneously and not one after another. Instead of the half-tone conversion, it is also possible to use another conversion, for example a monochromatic conversion, whereby a corresponding color-intensity barrier is evaluated instead of the half-tone barrier.

The digitized pictures of the motif are analyzed in the digital computer and are automatically converted to embroidery programs by comparing them with pre-programmed picture forms. The digital computer stores conversion programs for embroidery techniques, which correspond to various, known geometric picture forms such as lines and areas, which are repeated in each embroidery pattern. The motifs, which have been converted into binary values, can be composed section-by-section from the stored picture forms, following a corresponding comparison.

It makes sense to record the motif as at least one electronically scannable picture.

To prevent unintentional irregularities in the pattern at hand, it makes sense to filter out such irregularities by adjusting the half-tone barrier. In that way, weaving mistakes in the displayed pattern can be omitted during conversion. It is practical to set the half-tone barrier high enough so that the unintentional irregularities in the motif can no longer be distinguished. For the same purpose, the half-tone window can be fixed correspondingly through the maximum values of both its intensity values. In one practical design version, an embroidery program in composed by the digital computer from the pre-programmed geometric picture forms of a motif and by taking into account such additional input values as embroidery technique, directional instructions, step size and optimum puncture point as well as yarn return. The various, known geometric picture forms are straight lines and lines with varied curvature as well as areas of varied sizes to determine the embroidery pattern, which also contains the type of stitch to be used, meaning reed stitch or lock stitch.

The given method with digitized motif pattern is particularly suited for a step-by-step control of the automatic embroidery machine frame.

For embroidery programs, the working conditions for the motive conversion are considerably more difficult because of the free design arrangement of the embroidery elements in the area. In contrast, working conditions are less difficult for the conversion of weaving motifs in weaving programs, for which in each case one preferred orientation in two working directions, at right angles, exists, depending on the type of production of the woven or knitted material. In addition, embroidery programs require an embroidery technique suitable for the size of the area of the submitted picture form. While, for example, linear picture elements are reproduced with lock stitches in successive lines, the so-called reed stitch is generally used for areas, for which the threads run essentially vertical and side by side to the edge contour. For larger areas, however, the reed stitch technique can no longer be used because of the big thread span width, which results in the danger of damage during use and/or during washing. Larger areas thus have to be reproduced through parallel lines of lock stitches. The required distinction according to picture form and/or area size is best also done automatically in the digital computer.

Furthermore, with motifs, which are not clearly analyzed in picture segments or cannot be allocated to a pre-programmed area or line form by the digital computer, it can be practical to project the respective picture segment on the screen and to have service personnel request the working direction.

It makes sense to carry out this method with an optoelectronic scanning device, such as a video camera. With color motifs, it is practical to produce the scannable pictures, which correspond to the individual colors, one by one through use of color filters in front of the video camera lens. With color motifs, the number of pictures corresponds to the number of different colors so that an optoelectronic, magnetic or optical scannable picture is available for each color, the individual picture elements of which are converted to binary values through comparison with the respective barriers.

If necessary, it may be practical to select monochromatic lighting in accordance with the individual colors in place of successive scanning of the motif and the use of corresponding color filters in front of the lens, so that the scannable picture is produced without filters. For reasons of simplified operating conditions, it is generally preferable to use the color filters. Determination of the half-tone barrier or both intensity values of the half-tone window and/or the color intensity barrier, which eliminates unintentional irregularities in the motif pattern, can be done through focusing of the lens. A certain lack of focus will avoid the distinction of unintentional mistakes in the pattern, which are not to be repeated in the embroidery program.

With contrast-poor motifs, it may be of advantage to provide for electronic contrast accentuation, which will spread out the half-tone range and/or the color range with monchromatic motifs. Such electronic contrast accentuation and the various control elements used to heighten the contrasts are known from the television technology, in particular from night security devices.

For motifs which are stitched with the reed-stitch technique, it makes sense to smooth the edges of the contours of the digital picture to determine clearly the embroidery direction. This is done through computing the average value of the digitized values. The embroidery direction, that is the fold stretching, essentially runs vertical to the area elements of the edge contour.

On practical design version to carry through this method can be set up such that an optoelectronic scanning device is installed in front of motif carrier, a half-tone comparator follows this scanning device, the output of the half-tone comparator is connected to a digital computer and the digital computer is connected to at least one automatic embroidery machine. The embroidery program produced by the digital computer can displace the frame of an automatic embroidery machine directly, with a step-motor control, so as to correspond to the desired stitch succession. In place of the direct control, in many cases the embroidery program is stored in a program register from which it can be called and issued to the individual automatic embroidery machines. The embroidery programs stored in the program register can, if need be, also be transferred to other storage elements, used to control traditional automatic embroidery machines.

In place of the above mentioned step motor control, which is used for automatic embroidery machines with several parallel operating needle heads, the embroidery program can, if applicable, also be used to control sewing machines directly or indirectly, which can also be used to carry out an embroidery program with a suitable removable accessory.

By using the characteristic parts of the invention, it is possible to produce an embroidery program for automatic embroidery machines within a short time and without a specially (enlarged) pattern, independent of the manual operation of a scanning element. The conversion from motif to embroidery program is done automatically. All operational steps, starting with the insertion of the motif and up to the finished embroidery product, can be carried out in one system. The processing time from the insertion of the pattern with motive to the first sample only takes a few minutes. It is easy to make the required corrections in the embroidery program and they can be carried out with the help of the computer. Because the automatic embroidery machines have the advantage of being directly connected to the digital computer, which sets up the embroidery program, additional data carriers for intermediate storage of the embroidery program are not needed. By using an expandable digital computer, it is possible also to use accessory systems such as automatic graphics sketchers or external storage units.

BRIEF DESCRIPTION OF THE DRAWINGS

In the drawing, one design example of the invention—based method is explained with the aid of a block diagram.

DESCRIPTION OF THE PREFERRED EMBODIMENT

In front of a video camera 1, a motif carrier 2 is situated at a suitable film-taking distance. The pattern, which forms the motif, is on top of motif carrier 2 and is evenly illuminated through suitable light sources 3. The video camera is a known type of video camera and has filters 4, which are arranged according to the individual colors.

In addition to sufficient linearity, sufficient resolution is required of the video camera, meaning at least 8 MHz, in order to resolve a sufficient number of picture elements, e.g. 625, even at the horizontal level.

Evaluation of the charge image, produced in the video camera through scanning, is done in binary form by comparing it to the adjusted half-tone barrier or the determined signal value inside or outside of the half-tone window. The video signal is thereby fed to the half-tone comparator 5, which compares the signal value to the adjusted half-tone barrier or determines whether the signal value is inside and/or outside the determined half-tone window. The output of the half-tone comparator is fed to a digital computer 8 by way of a video interface 6 to the input and output unit 7 (e.g. the type known under the trade name PDP 11/23).

Following the respective programming, it produces the embroidery program. By way of a synchronous or recording control unit 9, digital computer 8 is also connected to half-tone comparator 5.

By way of a standard interface, digital computer 8 is connected to an automatic embroidery machine interface 10, which feeds the respective control impulses to a power output unit 11, used to drive the step motors of an automatic embroidery machine 12, which operate the frame movement.

The computed embroidery pattern can be displayed on a display screen terminal 13, which makes it possible to supervise the course of the work and/or the choice of desired patterns. The multiplex operation, indicated with dash-dot lines, makes it possible to connect several automatic embroidery machines 12 to the embroidery machine interface 10 for parallel operation.

I claim:

1. A method for controlling an automatic embroidery machine wherein individual scanning elements are copied from a displayed motif carrier and are transferred in the form of an embroidery program to a storage element, said embroidery program controlling at least one automatic embroidery machine by the coordinate displacement of its embroidery frame, comprising the steps of:

recording said motif as a line-scanned picture, which is converted to picture half-tones; wherein, in the case of color motifs, and line-scanned color-specific picture with scannable picture half-tones is recorded for each color of said color motif;

each picture is line-scanned;

each scanning element, which represents a picture half-tone of an intensity between black and white is compared with an adjustable half-tone barrier and is accordingly classified as either lighter or darker than said barrier and thereby converted to a binary value corresponding thereto, said binary values being stored within a digital computer which stores conversion programs for embroidery techniques which are allocated to a plurality of preselected geometric picture forms including lines and areas that are repeated in each embroidery pattern;

an embroidery program stored in the digital computer and corresponding to said displayed motif carrier is output to at least one automatic embroidery machine so as to control the operation thereof, said computer having stored said motif in a binary form in a section-by-section form from said geometric picture forms.

2. A method for controlling an automatic embroidery machine wherein individual scanning elements are copied from a displayed motif carrier and are transferred in the form of an embroidery program to a storage element, said embroidery program controlling at least one automatic embroidery machine by the coordinate displacement of its embroidery frame, comprising the steps of:

recording said motif as a line-scanned picture, which is converted to picture half-tones; wherein, in the case of color motifs, said line-scanned color-specific picture with scannable picture half-tones is recorded for each color of said color motif;

each picture is line-scanned;

each scanning element, which represents a picture half-tone of an intensity between black and white is compared with an adjustable half-tone window and is accordingly classified as being either inside or outside of the half-tone window and thereby converted to a binary value corresponding thereto, said binary values being stored within a digital computer which stores conversion programs for embroidery techniques which are allocated to a plurality of preselected geometric picture forms including lines and areas that are repeated in each embroidery pattern;

an embroidery program stored in the digital computer and corresponding to said displayed motif carrier is output to at least one automatic embroidery machine so as to control the operation thereof, said computer having stored said motif in a binary form in a section-by-section form from said geometric picture forms.

3. A method according to claims 1 or 2, wherein said motif is recorded as at least one electronically scanned picture.

4. A method according to claims 1 or 2, wherein said comparison step filters out minor irregularities in said motif.

5. A method according to claim 4, wherein said adjustable value is set sufficiently high to insure that minor irregularities in said motif are ignored.

6. A method according to claims 1 or 2, further comprising the step of manually inputting additional input including embroidery technique, given directions, step size, optimum puncture point, and yarn return, wherein said digital computer utilizes said manual inputs in its conversion.

7. A method according to claims 1 or 2, wherein in the case of motifs which cannot be clearly analyzed in picture segments and which cannot be allocated to an area or line-form by said digital computer, the additional step of displaying a respective picture segment on a display screen and requesting a work instruction from an operator.

8. A method according to claims 1 or 2, wherein scannable pictures are produced by a video camera technique and for color motifs, scannable pictures for the individual colors thereof are sequentially produced by the step of placing color filters in front of a lens of said video camera.

9. A method according to claim 8, wherein said adjustable value is adjusted through focusing of said video camera lens.

10. A method according to claims 1 or 2, further providing the step of adding electronic contrast accentuation for contrast-poor motifs so as to expand the half-tone range for said motif.

11. A method according to claims 1 or 2, wherein for the case of reed stitch motifs, edges of the contours of its corresponding digitized picture are smoothed so as to determine a specific embroidery direction.

12. An apparatus which operates in accordance with said method of claims 1 or 2, comprising an optoelectric scanning device which is mounted in front of a motif carrier and further comprising a half-tone comparator operatively connected to an output of said scanning device, said half-tone comparator having an output which is connected to a digital computer which is in turn connected to at least one automatic embroidery machine.

* * * * *